May 13, 1924.
L. D. ROUND
CONNECTING DEVICE
Filed March 17, 1920     3 Sheets-Sheet 1
1,494,289
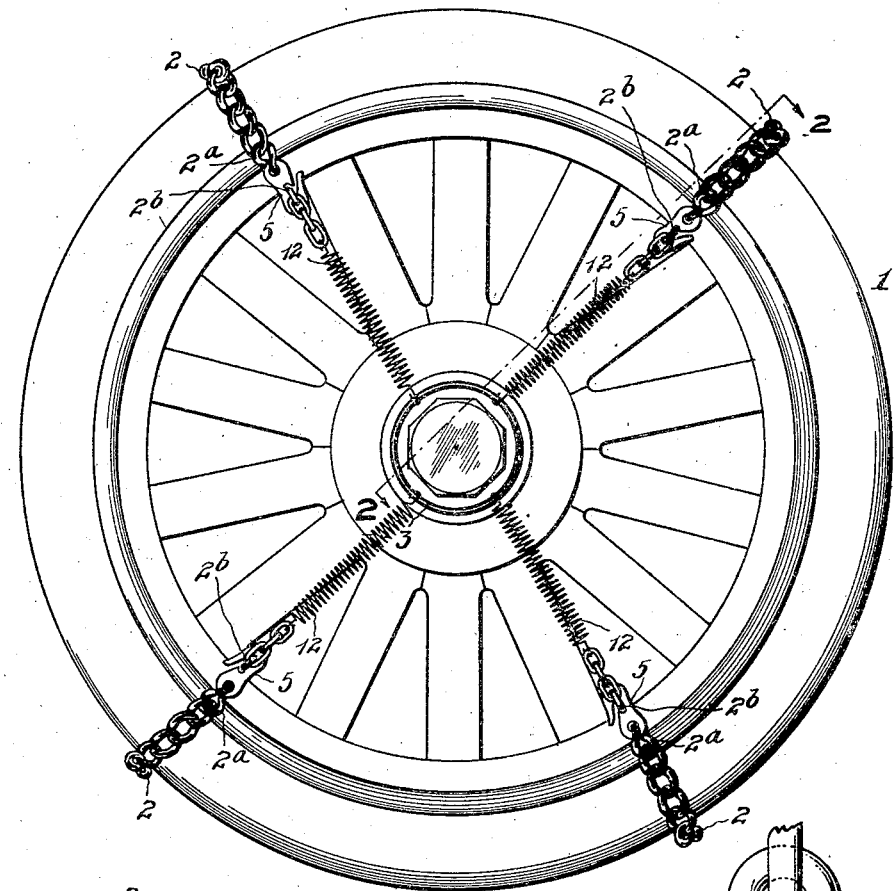
FIG. 1.
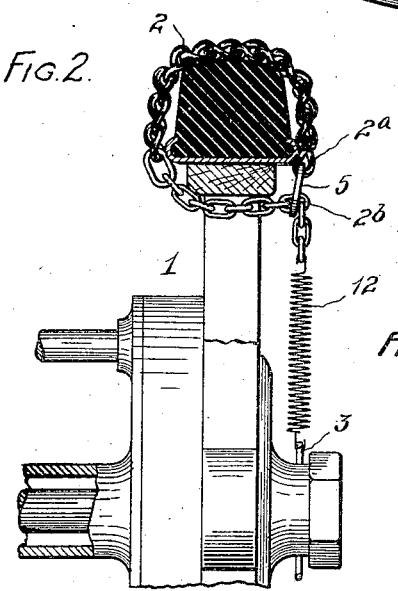
FIG. 2.
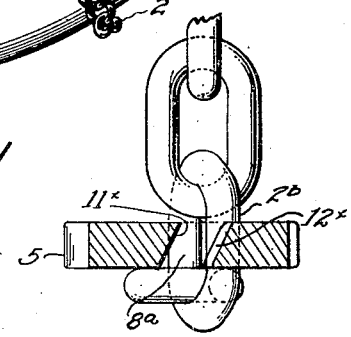
FIG. 11.     FIG. 12.
INVENTOR:
Louis D. Round,
BY
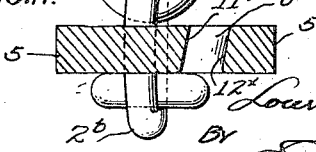
ATTORNEY.

May 13, 1924.

L. D. ROUND

CONNECTING DEVICE

Filed March 17, 1920     3 Sheets-Sheet 2

1,494,289

INVENTOR:
Louis D. Round,
BY
Edward D. Alcock
ATTORNEY.

May 13, 1924.

L. D. ROUND 1,494,289

CONNECTING DEVICE

Filed March 17, 1920      3 Sheets-Sheet 3

INVENTOR:
Louis D. Round,
BY
Edward R. Alexander
ATTORNEY.

Patented May 13, 1924.

1,494,289

UNITED STATES PATENT OFFICE.

LOUIS D. ROUND, OF CLEVELAND, OHIO, ASSIGNOR TO THE CLEVELAND CHAIN AND MANUFACTURING COMPANY, OF CLEVELAND, OHIO, A CORPORATION OF OHIO.

CONNECTING DEVICE.

Application filed March 17, 1920. Serial No. 366,494.

*To all whom it may concern:*

Be it known that I, LOUIS D. ROUND, a citizen of the United States, residing at Cleveland, in the county of Cuyahoga and State of Ohio, have invented certain new and useful Improvements in and Relating to Connecting Devices, of which the following is a specification.

This invention relates to devices for detachably connecting links of flexible members together, particularly links of chain.

As illustrating one useful application of my invention, I have shown it as connecting together certain of the links of chains after they have been applied to vehicle wheels for traction increasing and skid preventing purposes.

One object of the invention is to provide an improved device for detachably connecting chain links together, whereby one of the links can be readily attached or detached therefrom.

Another object of the invention is to provide a relatively simple connecting means for connecting one end of a chain and one of its intermediate links together, whereby the chain may be readily applied to or around a body or plurality of bodies and removed or adjusted for proper correlation therewith.

Another object of the invention is to provide an improved chain link connecting device which is constructed to permit ready attachment of one of the links thereto but prevents accidental detachment of the link due to shocks and jars upon the body to which the chain is applied.

Another object of the invention is to provide for chain links an improved connecting device which is formed with a seat for a link of the chain and an entrance slot leading to the seat, the walls of which slot and seat co-operate to prevent displacement or removal of the link due to jars and shocks upon the body to which the chain is applied.

Other objects of the invention will be apparent to those skilled in the art to which my invention relates from the following description taken in connection with the accompanying drawings.

For the purpose of illustration, I have, in the accompanying drawings shown and herein described one form of device embodying my invention.

Referring to the drawings:

Figure 1 illustrates a side elevation of a vehicle wheel equipped with anti-skid chains, the links of which are connected by devices embodying my invention.

Fig. 2 is a section on the line 2—2 of Fig. 1.

Figure 3:
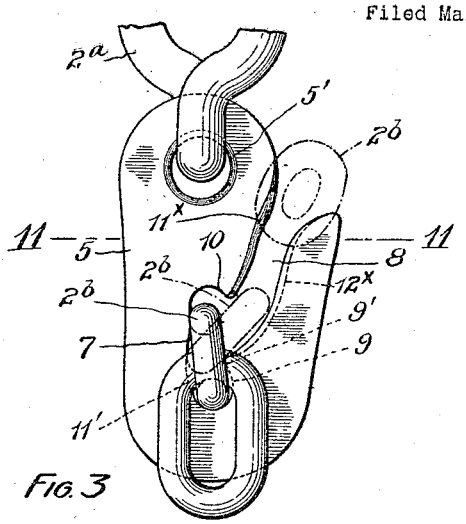
Fig. 3 is a fragmentary enlarged view showing the ends of the anti-skid chain connected by a connecting device embodying my invention.

Figs. 4 to 10, inclusive, are views substantially similar to Fig. 3 but showing slightly modified forms of the invention, respectively.

Fig. 11 is a section on the line 11—11 of Fig. 3.

Figure 4:
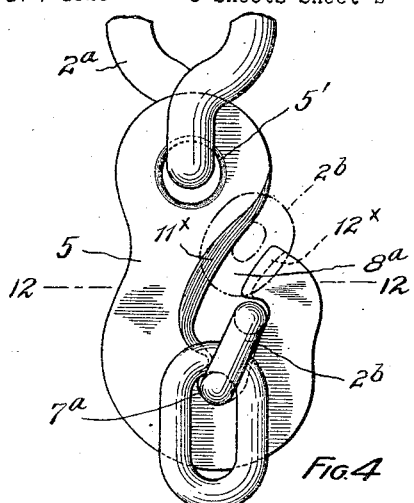

Fig. 12 is a section on the line 12—12 of Fig. 4.

In the drawings, 1 indicates as an entirety a vehicle wheel, which may be of any desired construction.

2 indicates a plurality of chains which extend transversely around the felloe, rim and tire and operate to increase traction between the latter and the road and to prevent skidding. The chains 2 are preferably connected to an annular member 3 on one side—the outer side—of the wheel, in the manner hereinafter set forth. The chains 2 are preferably uniformly spaced around the vehicle wheel and a greater or smaller number may be used as desired.

5 indicates a device for connecting two links of each chain 2 together.

In the illustrated application of my invention it will be seen that the connecting device 5 is pivotally carried by the link designated 2ª at one end of the chain 2 and that it is constructed in the manner to be presently described to permit one of the remaining links to be detachably connected to it after the chain 2 has been wrapped around or applied to the felloe, rim and tire.

The connecting device 5 comprises a hook member, which is suitably cast or forged. At its upper end, the hook member is provided with an opening 5′, through which the end link 2ª of the chain 2 passes to pivotally connect the hook member thereto. 7 indicates an opening formed in the hook member and arranged to bodily receive and form a seat for one of the remaining links of the chain 2, which link I will hereinafter refer to for convenience by the reference character 2ᵇ. 8 indicates an entrance slot or channel leading inwardly and downwardly from one side edge of the hook member and merging at its inner end with or into the opening 7 at one side thereof at a point between its opposite ends, but preferably nearer one end thereof than the other end. The side walls 9, 10, of the seat 7 adjacent to the inner end of the slot 8 form shoulders or stops to prevent displacement of the link 2$^b$ due to jars and shocks. By preference, the shoulder 9 is turned inwardly, as shown at 9', to overlie the adjacent side section of the link 2$^b$ to prevent movement thereof upwardly or longitudinally of the slot or channel 8 in the event the upper side section of the link should at any time swing laterally into said slot; whereas the downwardly extending shoulder 10 serves as a stop to prevent lateral movement of the upper side section of the link 2$^b$. The walls of the slot or channel 8 may be inclined or beveled, as shown at 11$^x$, 12$^x$, making it necessary to twist or turn the link 2$^b$ at an angle when positioning it in and removing it from the seat 7, and accordingly make it more difficult for the link to slide through the channel accidentally. The seat 7 is enlarged slightly at a point above its lower end and on that side opposite the inner end of the slot or channel 8, as shown at 11', to permit the manual positioning of the link 2$^b$ in the seat 7 and its removal therefrom. As shown, the enlargement 11' is substantially opposite the inturned shoulder 9' so that in inserting and removing the link 2$^b$ ample room is provided for it to pass around the shoulder 9'.

To position each of the chains 2 on the wheel 1, the chain is first placed over and around the tire, felloe and rim. The free end of the chain is then pulled so as to cause it to engage the tire with proper tension and looseness, and thereafter the appropriate link 2$^b$ of the chain is inserted or entered into the entrance channel or slot 8 and moved downwardly longitudinally therethrough into the seat 7. The forward side section of the link 2$^b$ is moved around the shoulder 9', such movement being permitted by reason of the enlargement 11', and positioned at the lower end of the seat 7; thereafter its upper side section is moved laterally to a point behind the shoulder 10. When positioned in this manner, the end sections of the adjacent outermost and innermost links engage the side walls of the slot 7 or opposite faces of the hook member and thus connect the chain 2 to the latter.

12 indicates a connector which connects the free end of the chain, after certain links thereof have been connected together by the device 5, to the annular member 3. The connector 12 preferably comprises a coiled spring which resiliently connects the chain 2 to the member 3 and resiliently acts to hold the link 2$^b$ in its seat 7. At the same time it prevents movement of the chain 2 in a transverse direction around the tire, felloe and rim, but permits a limited movement of the chain in either direction circumferentially of the wheel 1. In case of breakage of the chain the spring 6 will pull the broken sections away from the wheel and prevent its entanglement with the driving, braking and structural elements of the vehicle.

From the foregoing description, it will be seen that by reason of the co-operative relation of the walls 9 and 10 and the inturned shoulder 9', displacement or accidental removal of the link 2$^b$ from its seat 7 by reason of jars and shocks due to the operation of the vehicle is prevented. Furthermore, as the spring 12 imparts a yielding pull on the link 2$^b$, it will always be returned to its seat should the shocks and jars be such as to cause it to move therefrom.

Figure 5:
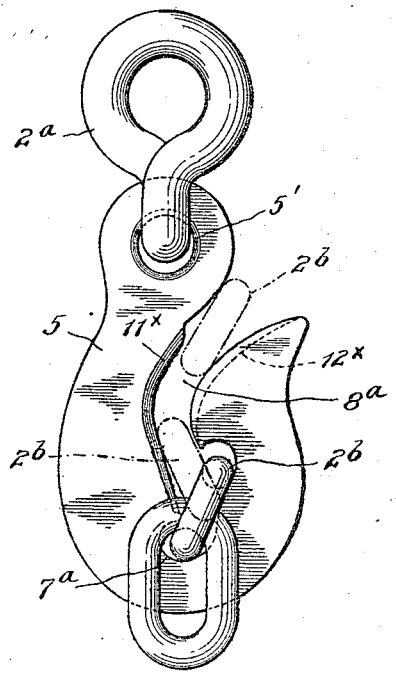

Figs. 4 and 5 illustrate slightly modified forms of the invention, wherein the seat 7$^a$ for the link 2$^b$ is slightly inclined and the entrance slot or channel 8$^a$ leads thereinto on the side opposite to that shown in Fig. 3.

Figure 6:
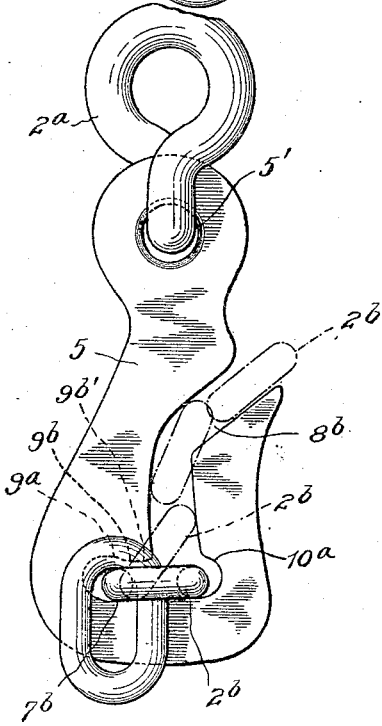
Figure 7:
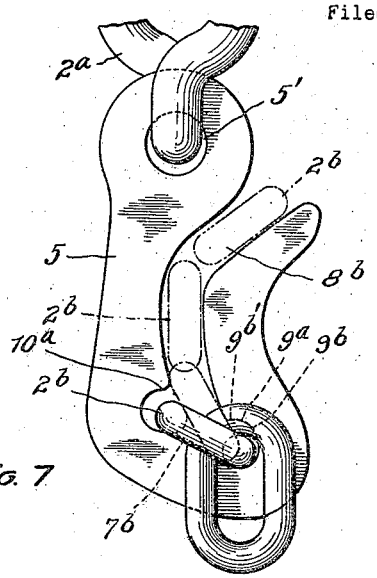

In Figs. 6 and 7 I have shown other slightly modified forms of the invention wherein the seat 7$^b$ for the link 2$^b$ is arranged horizontally, or substantially so. 8$^b$ indicates the entrance slot or channel, which extends in a circuitous direction from one edge of the hook member inwardly and downwardly, its lower end merging into the upper side wall of the seat 7$^b$ at a point between its opposite ends.

This construction provides at either side of the channel 8$^b$ shoulders 9$^a$, 10$^a$, which serve as stops to prevent the displacement of either side section of the link 2$^b$ from the seat 7$^b$. By preference the inner end of the slot or channel 8$^b$ enters the slot 7$^b$ nearer one end thereof than the other. This construction also provides a relatively long shoulder 9$^b$. As shown at 9$^{b'}$, the wall of the shoulder 9$^b$ is turned downwardly slightly to form a stop or abutment which prevents movement of the link 2$^b$ in its seat as well as all danger of displacement thereof. As shown at 9$^b$, that portion of the seat wall disposed rearward of the stop 9$^{b'}$ is cut away or enlarged to afford ample space for movement of one arm of the link to an abnormal position so that it can be inserted in the seat 7$^b$ or removed therefrom when the device 2 is applied to or removed from the wheel 1.

Figure 8:
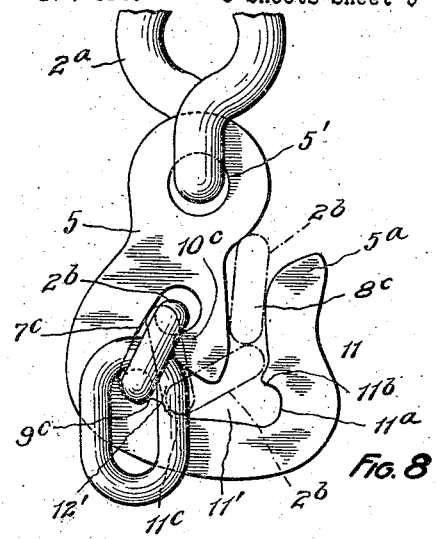
Figure 9:
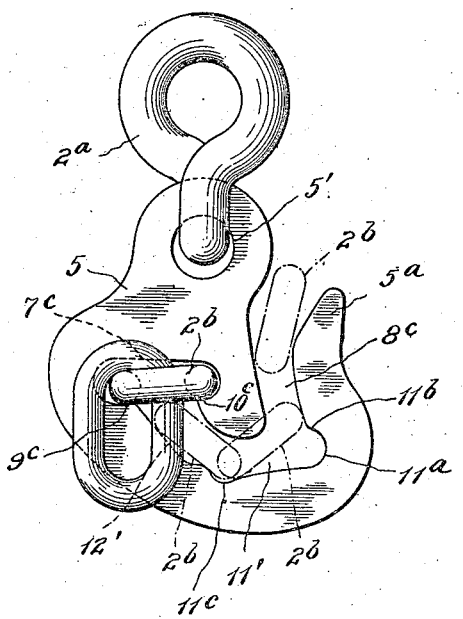

In Figs. 8 and 9 I have shown further modified forms of the invention. Referring to these views, 7$^c$ indicates the chain link seat which is shaped like the seats shown in Figs. 3 to 7, inclusive. 8$^c$ indicates the entrance slot or channel. In this form of the invention the channel 8$^c$ extends inwardly from the free edge of the hook member 5$^a$ and then downwardly. At the lower end of the downward section, the channel 8ᶜ extends laterally, as shown at 11', and then upwardly, as shown at 12' into the seat 7ᶜ. The section 11' is formed with a recess 11ᵃ, whereby is formed a shoulder 11ᵇ to prevent displacement and accidental removal of the link 2ᵇ. At 11ᶜ the section 11 is enlarged so that a side section of the link 2ᵇ can be moved thereinto to permit its movement through the channel in either direction. In this form of the invention it will be seen that the inner end of the channel 8ᶜ enters the seat 7ᶜ on its lower side. Accordingly the link 2ᵇ is held against the shoulders 9ᶜ, 10ᶜ, by gravity, and as the upper side walls of the seat 7ᶜ are closed, it will be impossible for the link 2ᵇ to be displaced by jars or shocks which cause it to move upwardly. However, by forming an intermediate section 11 in the entrance channel 8ᶜ, I provide a supplemental seat for the link 2ᵇ wherein it will be held against accidental displacement or movement upwardly through the vertical section of the channel 8ᶜ, in the event it should be jolted out of the seat 7ᶜ or the operator by mistake position the link 2ᵇ in the section 11 instead of the seat 7ᶜ.

Figure 10:
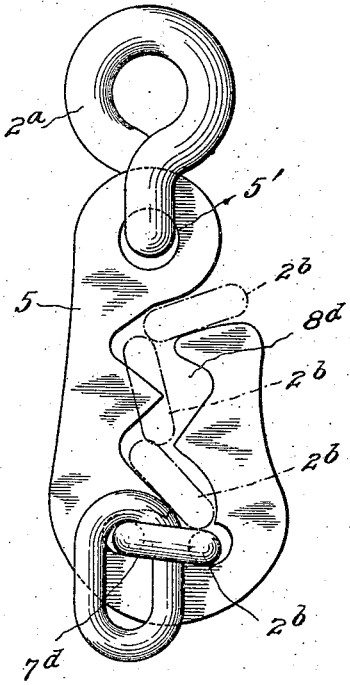

Fig. 10 illustrates a further modified form of the invention. In this form of construction the chain link seat 7ᵈ is preferably arranged horizontally and the entrance slot or channel 8ᵈ is of substantially zigzag shape from its outer end to its inner end. By such construction the opposing angularly arranged walls of the channel form stops which cooperate to prevent displacement of the link from the seat 7ᵈ and movement thereof upwardly.

The connecting device 5 embodying my invention is particularly advantageous for use in that type of anti-skid equipment wherein the free or detachable end of the chain 2 is connected to some stationary member, such as the annular member 3, preferably by means of a spring.

In this type of construction, there is a constant pull on the chain 2 and in the event the link 2ᵇ thereof is, by reason of a jar or shock, bodily or partly thrown from its seat 7, it will return thereto by reason of the downward pull on the chain exerted by the connector 12.

From the foregoing description it will be seen that I provide a connecting device for the opposite ends of the chain 2 which permits ready attachment and detachment thereof. It will also be seen that I prevent accidental detachment of the chain ends in a relatively simple manner and without the provision of any elements, parts or devices other than those forming the essential instrumentalities of the connection.

In connecting the chain links together, the free end of the chain is pulled laterally until the chain encircles the tire, rim and felloe with the proper tension or looseness and then the adjacent link is moved into the opening 8 and slot 7. It will therefore be seen that the construction is of a character to permit the ready attachment of the chains 2 to various sized tires, rims and felloes and to permit take-up due to wear of the tire.

To those skilled in the art to which this invention relates many alterations in construction and widely differing embodiments and applications of my invention will suggest themselves without departing from the spirit and scope thereof. My disclosures and description herein are purely illustrative and are not intended to be in any sense limiting.

What I claim is:

1. In devices of the character described, the combination with a link, of a device for connecting said link with a chain, said device being formed with an elongated opening arranged to receive the spaced side sections of one of the chain links with the adjacent ends of the adjoining links disposed substantially transversely of the opening and engaging opposite sides of said device, and a circuitous entrance slot leading from one edge of the device to said opening and merging therewith between its opposite ends, but nearer one end than the other, and forming at either side of the slot shoulders with which the side sections of the link in the opening engage.

2. In devices of the character described, the combination with a link, of a device for connecting said link with a chain, said device being formed with an elongated seat arranged to receive the spaced side sections of one of the chain links with the adjacent ends of the adjoining links disposed transversely of the seat and engaging the opposite sides of said device, and a circuitous entrance slot leading from one edge of the device to said seat and merging therewith between its opposite ends to form at either side of the slot shoulders with which the side sections of the link in the seat engage.

3. In devices of the character described, the combination with a link, of a device for connecting said link with the links of a chain, said device being formed with an elongated opening arranged to receive the spaced side sections of one of the chain links with the adjacent ends of the adjoining links disposed transversely of the opening and engaging opposite sides of said device, and an entrance slot leading from one edge of the device to said opening and merging therewith between its opposite ends, but nearer one end than the other to form at one side of the slot a short shoulder and at the other side thereof a long shoulder, the wall adjacent the slot forming one of the shoulders projecting inwardly.

4. In devices of the character described, the combination with a link of a device for connecting said link with a chain, said device being formed with an elongated opening arranged to receive the spaced side sections of one link of the chain which the adjacent ends of the adjoining links disposed substantially transversely of the opening and engaging opposite sides of said device, and an entrance slot for the side sections of the links to be seated in the opening, leading from one edge of the device to said opening and merging therewith between its opposite ends, the walls of the opening being disposed at substantially right angles to the opposite sides of the device and the walls of the slot being inclined thereto but substantially parallel to each other.

5. In devices of the character described, the combination with a linked chain, of a device for connecting one link of the chain with other links thereof, said device being formed with a seat arranged to receive one of the chain links and a circuitous entrance slot leading from one edge of the device to said seat and merging therewith between its opposite ends to form shoulders at either side of the slot, the wall of the seat opposite one of the shoulders being cut away to enlarge the seat.

6. In devices of the character described, the combination with a linked chain, of a device for connecting one link of the chain with other links thereof, said device being formed with a seat arranged to receive one of the links of the chain and a circuitous entrance slot leading from one edge of the device to said seat and merging therewith between its opposite ends, but nearer one end thereof than the other to form a long shoulder at one side of the slot and a short shoulder at the opposite side thereof, that portion of the seat opposite the long shoulder being enlarged.

7. In devices of the character described, the combination with a linked chain, of a device for connecting one link of the chain with other links thereof, said device being formed with a seat arranged to receive one of the chain links and a circuitous entrance slot leading from one edge of the device to said seat and merging thereinto at a point between its opposite ends but nearer one end than the other to form a long shoulder and a short shoulder at opposite sides of the slot, and means normally tending to maintain the chain link in said seat at the end adjacent the long shoulder.

8. A device of the character described having an opening through which is ringed a link, and formed with a seat arranged to receive an intermediate link of a chain and an entrance slot leading from one edge of the device to said seat and merging therewith between its opposite ends whereby are formed shoulders at either side of said slot, the walls of the slot being substantially parallel to each other but inclined relatively to the opposite faces of said device.

9. A device of the character described arranged to be connected at one end to a link and formed with a seat arranged to receive an intermediate link of a chain and a circuitous entrance slot leading from one edge of the device to said seat and merging therewith between its opposite ends to form a shoulder at either side of the slot, the wall of the seat opposite one of the shoulders being cut away to enlarge the seat.

10. In devices of the character described, the combination with a linked chain, of a device for connecting one link of the chain with other links thereof, said device being formed with a seat arranged to receive one of the intermediate chain links and a circuitous entrance slot leading from one edge of the device to said seat and merging therewith between its opposite ends, whereby are formed shoulders at either side of said slot, and the side walls of said slot being inclined or beveled.

In testimony whereof I affix my signature.

LOUIS D. ROUND.

Witnesses:
L. D. Cull,
G. E. Gugsby.